Patented July 23, 1946

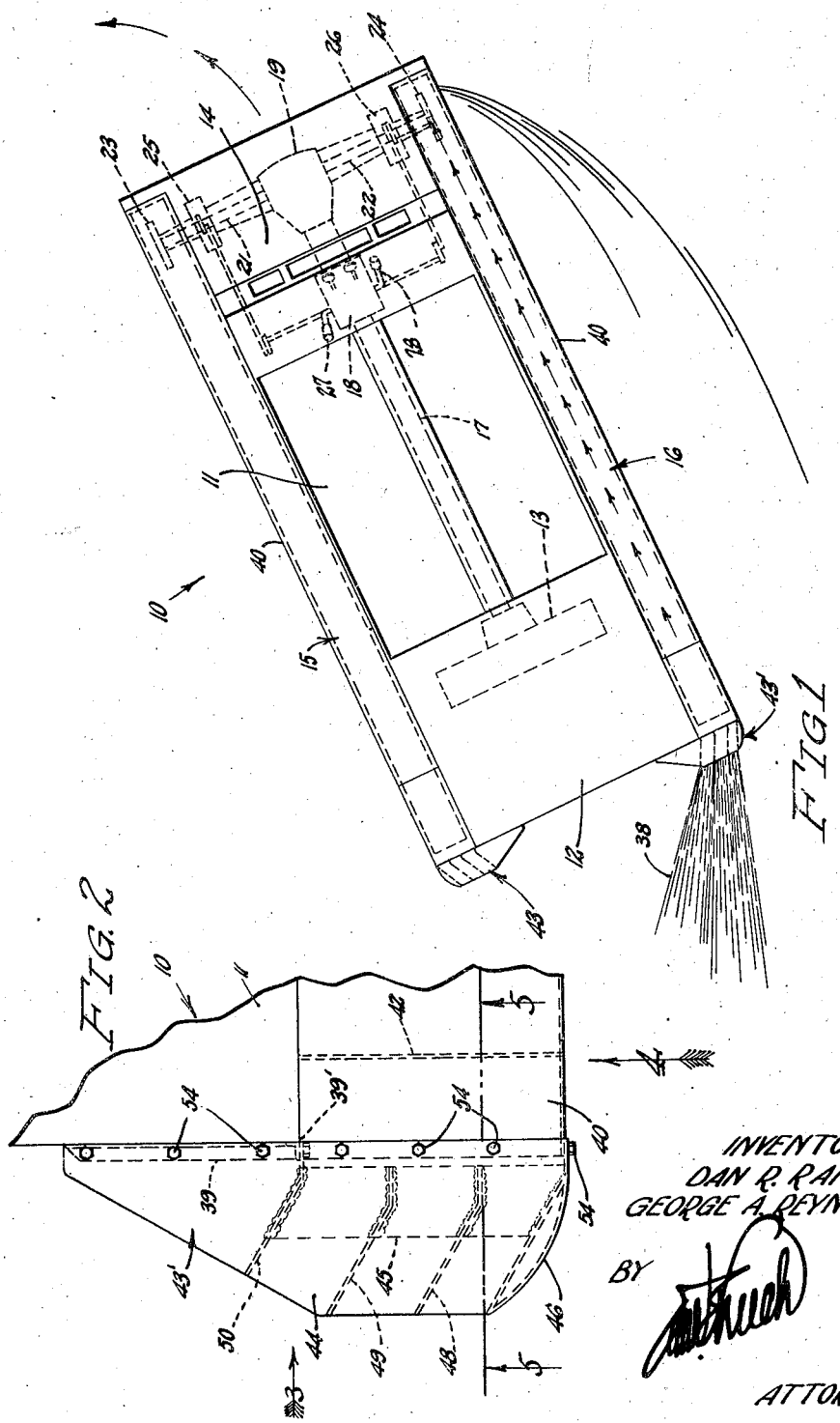

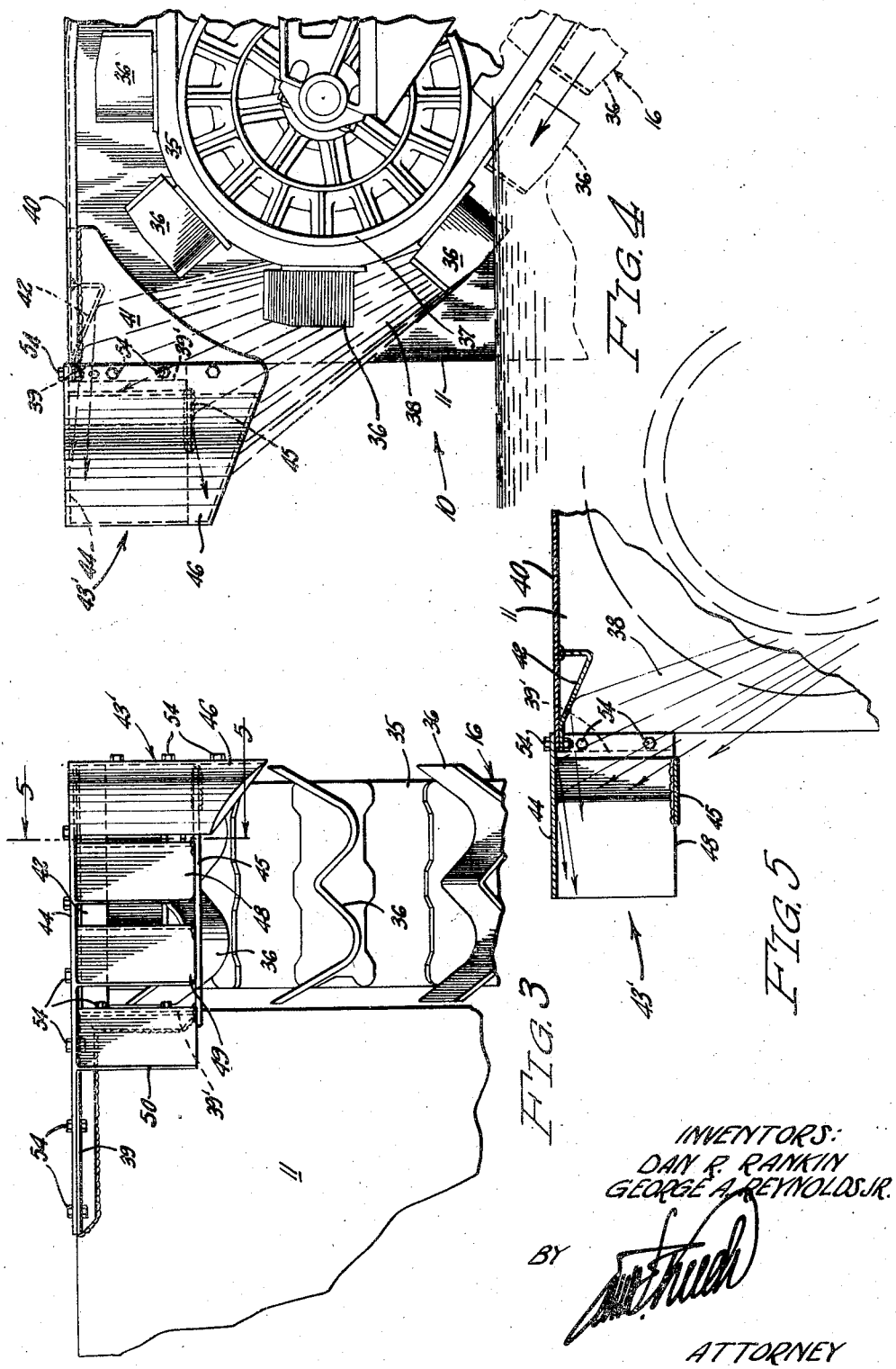

2,404,528

UNITED STATES PATENT OFFICE 2,404,528

AMPHIBIAN STEERING MECHANISM

Dan R. Rankin and George A. Reynolds, Jr., Los Angeles, Calif., assignors to Food Machinery Corporation, San Jose, Calif., a corporation of Delaware Application October 19, 1942, Serial No. 462,484

6 Claims. (Cl. 115—1)

1

This invention relates to the art of steering amphibious land and water craft while in the water. It is especially useful on amphibious tanks.

An object of the invention is to provide an improved steering mechanism for use on amphibious tanks which will be relatively simple and require a minimum of mechanism for controlling the same.

It is another object of the invention to provide a steering mechanism for controlling amphibious military tanks in the water which functions without any special control apparatus and merely by selective driving of the track laying belts provided on opposite sides of the tank.

It is a further object of the invention to provide a device for steering amphibious military tanks in the water which comprises, in addition to equipment already provided on the tank necessary for its locomotion on land and in the water, only parts which are rigidly fixed on the body of the tank.

The manner of accomplishing the foregoing objects as well as further objects and advantages will be made manifest in the following description taken in connection with the accompanying drawings in which Fig. 1 is a diagrammatic plan view of an amphibious military tank equipped with a preferred embodiment of the steering device of the invention, said tank being shown while turning in response to the operation of said device.

Fig. 2 is an enlarged fragmentary plan of the right hand rudder group of the invention.

Fig. 3 is a rear elevational view of Fig. 2 taken in the direction of arrow 3.

Fig. 4 is a right side elevational view of Fig. 2 taken in the direction of arrow 4.

Fig. 5 is a diagrammatical vertical sectional view taken on line 5—5 of Figs. 2 and 3.

Referring specifically to the drawings, the amphibian tank 10 shown in Fig. 1 has a buoyant hull 11 embodying an engine compartment 12 in which a radial engine 13 is housed and a control cabin 14 located at the front end of the craft. Disposed along opposite sides of the hull are track laying mechanisms 15 and 16, these being driven by the motor 13 through a drive shaft 17, a transmission 18, a differential 19, shafts 21 and 22, and sprockets 23 and 24. Shafts 21 and 22 are provided with brakes 25 and 26 which are controlled respectively by levers 27 and 28 provided in the control cabin 14. Thus, pulling on the lever 27 applies the brake 25 to retard the operation of the track laying mechanism 15 and

2 to cause mechanism 16 to operate with increased speed. On the other hand, releasing lever 27 and pulling on the lever 28 has the opposite effect.

As shown in Figs. 3 and 4, each of the mechanisms 15 and 16 has a track forming belt 35 which is provided with an endless series of grousers 36, this belt travelling upwardly around an idler sprocket 37 at the stern of the craft. As the grousers 36 come out of the water in rising upwardly toward the sprocket 37, they create a stream of water 38 which at all times is discharged rearwardly from this mechanism through the air above the water sustaining the craft.

Fixed as by welding to the rear face of the hull 11 along the upper and outer corner edges thereof are angle irons forming horizontal and vertical flanges 39 and 39'. Welded onto the sides of the hull 11 and extending outwardly over the mechanisms 15 and 16 are guard plates 40. These are flush with the top of the rear corners of the engine compartment 12 of the hull and extend rearwardly flush with the rear edges of flanges 39. Each guard plate 40 has welded to its outer side edge to extend downwardly therefrom, a gusset guard 41, the forward edge of which is preferably concentric with the sprocket 37, and the rear edge of which lies in the same vertical plane with rear edges of the flanges 39 and the plates 40.

Secured to each plate 40, as by welding its front edge to the bottom of said plate, and with its rear edge lying against and flush with the rear edge of said plate 40 is a horizontally inclined member 42.

Mounted on the rear upper corners of the hull 11 are water deflector devices 43 and 43', which are reverse duplicates of each other. Each of these devices includes top and bottom plates 44 and 45 which are welded to a relatively deep outer deflector blade 46 and to inner deflector blades 48, 49 and 50. Each of the devices 43 and 43' is attached to the tank 10 by bolts 54 which fasten it securely to the adjacent flanges 39 and 39', and to rear edges of the adjacent plate 40 and gusset guard 41.

The deflectors 46, 48, 49 and 50 of each of the devices 43 and 43' are inclined inwardly, as clearly indicated in Figs. 1 and 2, and are disposed in the paths of the two streams of water 38 discharged rearwardly from the grousers 36 of the track laying mechanisms 15 and 16.

These streams of water are thus deflected inwardly resulting in a considerable side thrust being set up against each of the devices 43 and 43' when both of the mechanisms 15 and 16 are operating. When one of these mechanisms is slowed, however, by pulling one of the levers 27 or 28, which also causes the other mechanism to operate even more rapidly, the unbalanced thrust thus developed at the rear end of the hull 11 by the stream of water 38 from the track laying mechanism which is running at an accelerated rate produces a turning movement of the craft 10 in the opposite direction.

This is well illustrated in Fig. 1 where the lever 27 is shown as pulled back to retard the mechanism 15 and accelerate the operation of the mechanism 16. The result of this is to turn the craft 10 to the left. The reverse operation accomplished by releasing the lever 27 and pulling on the lever 28 produces exactly the opposite effect.

The hollow construction of the outer blades 46 of the devices 43 and 43' is for purposes of giving these deflectors strength to resist the shocks to which they are subjected when the tank 10 backs up into brush, trees or jungle growth. The purpose of making these outer blades longer than the inner blades 48, 49, and 50 is to catch and confine the streams 38 from spraying out laterally sideways from the tank.

Another very useful function performed by the devices 43 and 43' is to confine and deflect the water streams 38 downwardly as well as inwardly from the paths along which they are travelling when they impinge against these devices. This greatly reduces the visibility of these streams and diminishes the ability of the enemy to detect the approach of these tanks, especially where they are operating in phosphorescent water at night. Where a tank carries armor on the control cabin 14 it is highly desirable to depress the rear of the tank, as this increases the operating efficiency of the tank in the surf and at sea.

The inclined members 42 deflect rearwardly the portions of streams 38 engaging these members, thereby decreasing the "lift" on the rear end of the tank which would otherwise be caused by controlling these streams and utilizing them in steering the tank.

It is thus seen that we have provided a means for steering amphibian craft without the addition of any moving parts, the steering being accomplished by manipulating the controls for the track laying mechanisms which are a part of the ordinary propulsive equipment. It is further clear that the means we have provided for this diminishes the ability of the enemy to detect the approach of tanks equipped with our invention.

We claim:

1. In an amphibian craft, the combination of: a hull; right and left hand track laying belts on the opposite sides of said hull; an endless series of blades on said belts for engaging the water when said craft is afloat; power means for driving said belts to propel said craft through the water, said blades on said belts discharging streams of water rearwardly above the surface of the water sustaining said craft; means fixed on said hull for deflecting said streams of water inwardly; and means for controlling the driving of said belts so that these may be selectively driven.

2. A combination as in claim 1 in which said deflecting means on each side of said craft includes a relatively deep outer deflector and at least one relatively shallow inner deflector, said deflectors being mounted upon a relatively horizontal plate secured to the aforesaid hull of said craft.

3. In a dirigible water craft the combination of: propulsion means provided on opposite sides of said craft, said means in their operation discharging streams of water rearwardly through the air above the surface of the water sustaining said craft; deflectors mounted on said craft and fixed in the path of said streams of water to deflect the same oppositely; and means for selectively controlling the operation of said propulsion means to effect a steering of said craft by said deflectors.

4. In a dirigible water craft the combination of: propulsion means provided on opposite sides of said craft, said means in their operation discharging streams of water rearwardly through the air above the surface of the water sustaining said craft; fixed deflectors mounted on said craft and disposed in the path of said streams of water to deflect said streams sideways in opposite directions; and means for selectively controlling the operation of said propulsion means to effect a steering of said craft by said deflectors.

5. In a dirigible water craft, the combination of: a hull; right and left hand propulsion means provided on opposite sides of said hull, each of said means in its operation discharging a stream of water rearwardly through the air, above the surface of the water sustaining said craft; means for controlling the operation of said right and left hand propulsion means, to drive these simultaneously or separately; and deflector means fixed in the paths of said streams so as to deflect the latter inwardly, whereby the driving of one of said propulsion means at a higher speed than the other causes an unbalanced turning moment to be produced by the reaction of the deflector means to the stream produced by the faster moving propulsion means.

6. In a dirigible water craft, the combination of: a hull; right and left hand propulsion means provided on opposite sides of said hull, each of said means in its operation discharging water rearwardly; means for controlling the operation of said right and left hand propulsion means, to drive these simultaneously or separately; and deflector means fixed in the paths of said discharged water so as to deflect the latter inwardly, whereby the driving of one of said propulsion means at a higher speed than the other causes an unbalanced turning moment to be produced by the reaction of the deflector means to the water discharged by the faster moving propulsion means.

DAN R. RANKIN.
GEORGE A. REYNOLDS, Jr.